United States Patent
Shieh

[11] Patent Number: 6,152,465
[45] Date of Patent: Nov. 28, 2000

[54] FOLDABLE GOLF CART

[76] Inventor: Shanq-Ching Shieh, 6Fl., No. 105, Yung-An St., Yualin Chen, Changhua Hsien, Taiwan

[21] Appl. No.: 09/140,625

[22] Filed: Aug. 26, 1998

[51] Int. Cl.[7] .............................. B62D 61/06; B62B 3/02
[52] U.S. Cl. ...................... 280/62; 280/DIG. 6; 280/651
[58] Field of Search ............................ 280/DIG. 6, 641, 280/642, 652, 654, 655, 651, 62; 403/97, 96

[56] References Cited

U.S. PATENT DOCUMENTS

| | | | |
|---|---|---|---|
| 4,289,324 | 9/1981 | Nemeth | 280/DIG. 6 |
| 4,657,100 | 4/1987 | Lewis | 280/DIG. 6 |
| 5,154,435 | 10/1992 | Chiu | 280/DIG. 6 |
| 5,281,044 | 1/1994 | Chen | 280/DIG. 6 |
| 5,409,253 | 4/1995 | Cheng | 280/DIG. 6 |
| 5,526,894 | 6/1996 | Wang | 280/DIG. 6 |
| 5,577,744 | 11/1996 | Parks | 280/639 |
| 5,582,419 | 12/1996 | Lucia et al. | 280/DIG. 6 |
| 5,645,255 | 7/1997 | Parduhn | 403/97 |
| 5,667,239 | 9/1997 | Yang | 280/DIG. 6 |
| 5,857,684 | 1/1999 | Liao et al. | 280/DIG. 6 |
| 6,000,712 | 12/1999 | Wu | 280/DIG. 6 |

*Primary Examiner*—Lanna Mai
*Assistant Examiner*—Jeff Restifo
*Attorney, Agent, or Firm*—Dellett and Walters

[57] ABSTRACT

A foldable golf cart includes a chassis with a front wheel and two rear wheels connected thereto, two connecting frame members connecting the chassis and the handle, a foldable device at the junction of the connecting frame members and the handle so that the handle is foldable relative to the connecting frame members. The two connecting members are respectively connected to two sleeves mounted to the axle connected between the two rear wheels and each of the sleeves has a plate extending therefrom through which two apertures are defined. Two U-shaped brackets are connected to the axle and each has a pin movably extending therethrough which is insertable into either one of the two apertures of the plate corresponding thereto so as to position the connecting frame members in either the folded position or the operating position.

4 Claims, 7 Drawing Sheets

FOLDABLE GOLF CART

FIELD OF THE INVENTION

The present invention relates to a golf cart, and more particularly, to a foldable golf cart wherein the handle and the connecting frame are foldable to become a compact size.

BACKGROUND OF THE INVENTION

A conventional golf cart generally comprises a chassis with a front wheel and two rear wheels respectively connected to the chassis, two connecting frame members extending from the rear end of the chassis and connecting the chassis and the handle. An upper bag support is connected to the connecting frame and a lower bag support is connected to the chassis so that a golf bag (not shown) is supported on the upper bag support and the lower bag support and can be moved with the golf cart. However, such a golf cart can not be folded to a compact size so that it occupies a lot of space when stored. Furthermore, the angle at which the handle extends relative to the ground is fixed so that a tall user and a short user cannot be satisfied with a golf cart with a fixed handle.

The present invention intends to provide a foldable golf cart whose handle and connecting frame can be folded so that different users may adjust the cart according to their needs. Therefore, the shortcomings of the conventional golf cart mentioned above can be mitigated.

SUMMARY OF THE INVENTION

In accordance with one aspect of the present invention, a foldable golf cart is provided and comprises a chassis having a front wheel and two rear wheels connected thereto with an axle connected between the two rear wheels. A lower bag support extends from the front end of the chassis, with two sleeves rotatably mounted to the axle and each having a plate extending radially outward therefrom. Each of the plates has at least two apertures defined therethrough. Two U-shaped frame members are connected to two bearings mounted to the axle, and each has a pin extending movably therethrough which is insertable into either one of at least two apertures in the plate corresponding thereto.

Two connecting frame members are respectively connected to the two sleeves, and each has a clamp assembly connected to the free end thereof. A cylindrical member is rotatably connected between the two clamp assemblies, and a bolt extends through the two clamp assemblies, and the cylindrical member. A lever is threadedly engaged with the bolt. An upper bag support is connected to the two clamp assemblies, and a handle is fixedly connected to the cylindrical member.

It is an object of the present invention to provide a golf cart wherein the handle thereof is foldable toward the connecting frame.

It is another object of the present invention to provide a golf cart wherein the connecting frame members thereof are foldable toward the chassis.

Further objects, advantages, and features of the present invention will become apparent from the following detailed description with appropriate reference to the accompanying drawings.

DETAILED DESCRIPTION OF THE PREFERRED EMBODIMENTS

Figure 1:
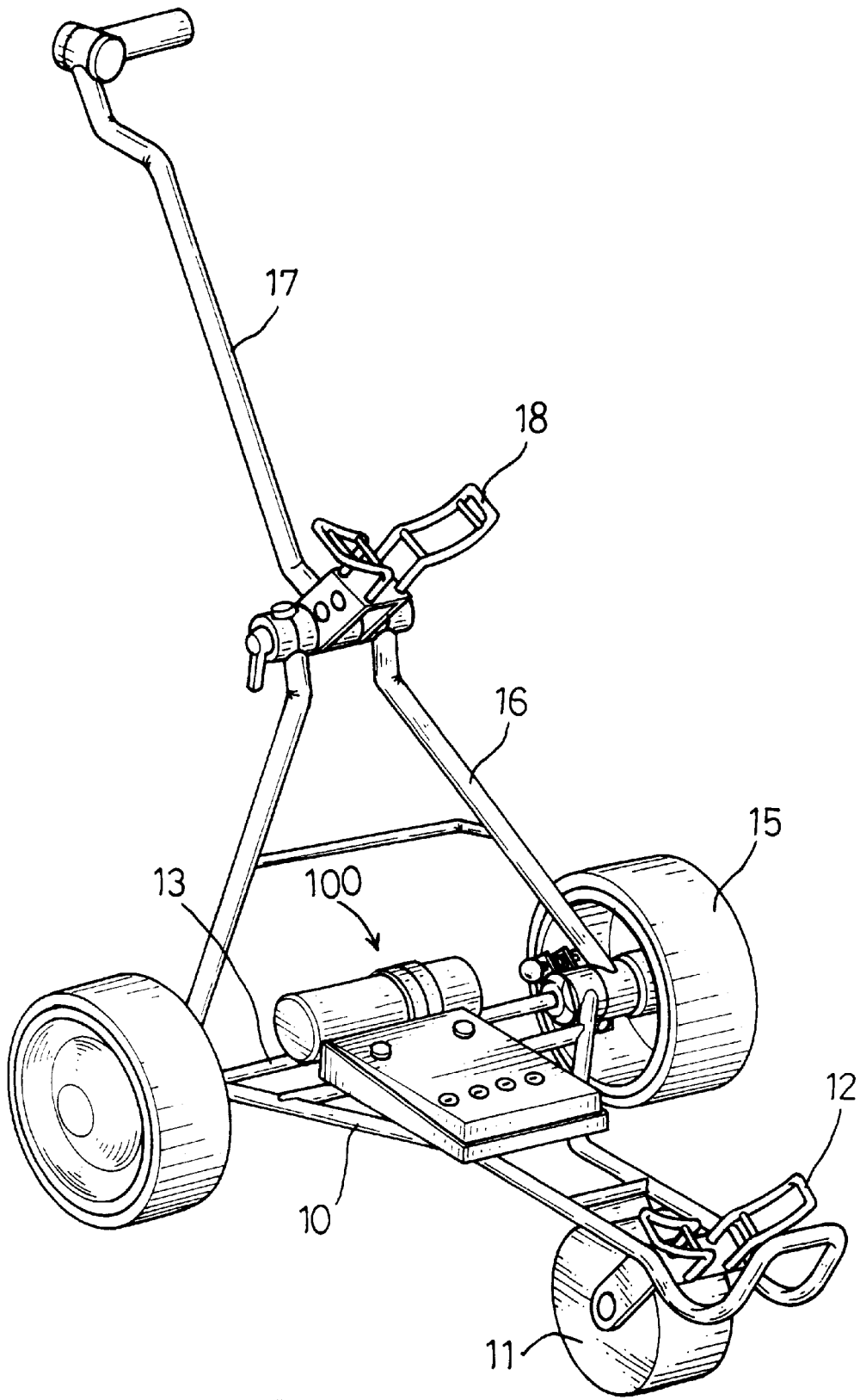
FIG. 1 is a perspective view of a golf cart in accordance with the present invention.
Figure 2:
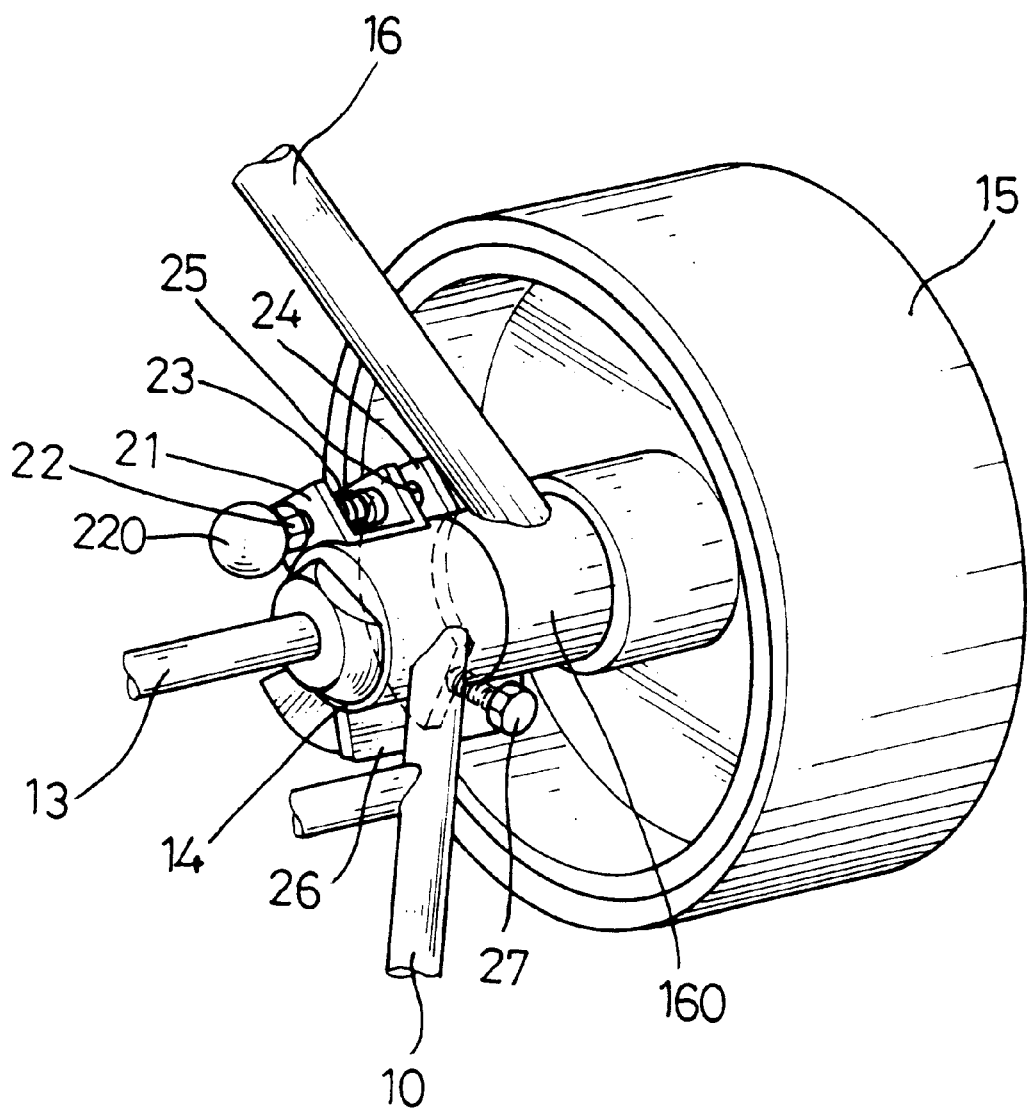
FIG. 2 is a perspective view of the foldable device connected between one of the two connecting frame members and the rear wheel corresponding thereto of the golf cart.
Figure 3:
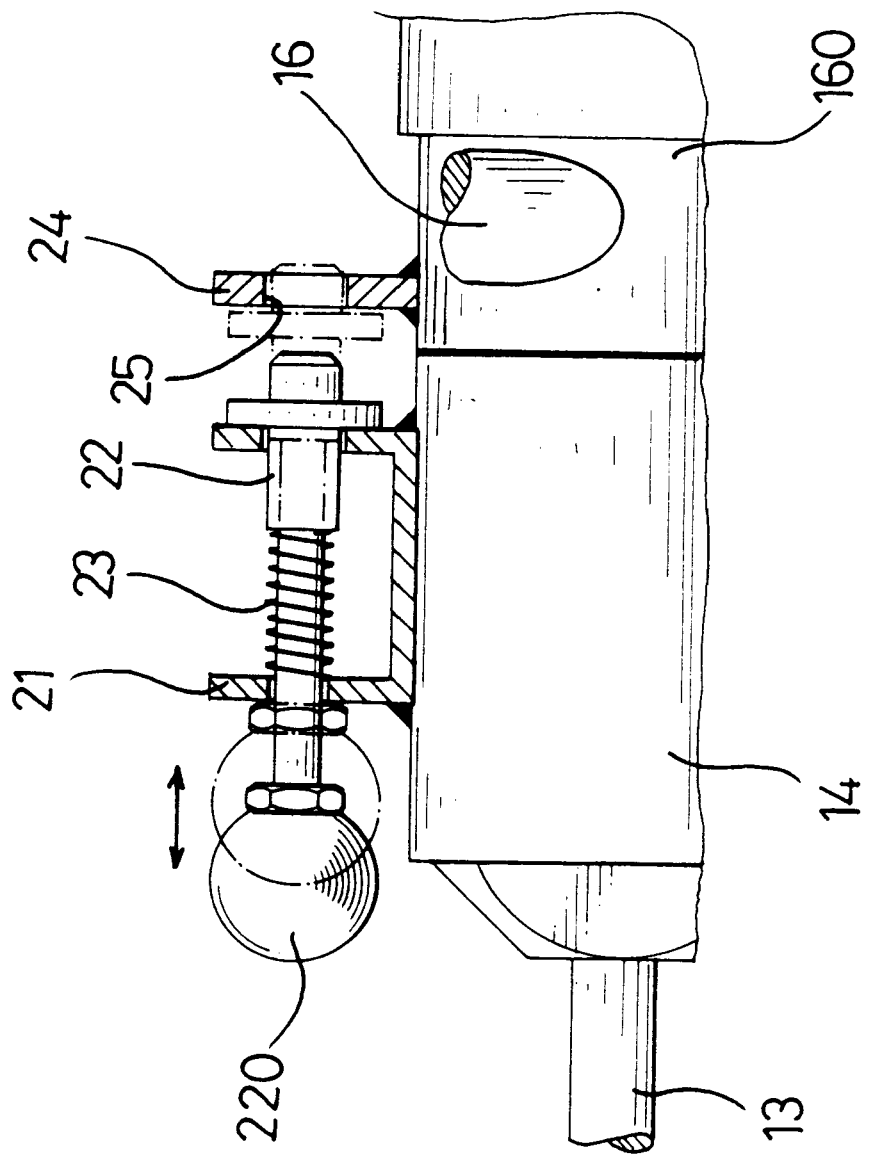
FIG. 3 is a side elevational view, partly in section, of the locking device for positioning the connecting frame and the chassis of the golf cart in accordance with the present invention.
Figure 4:
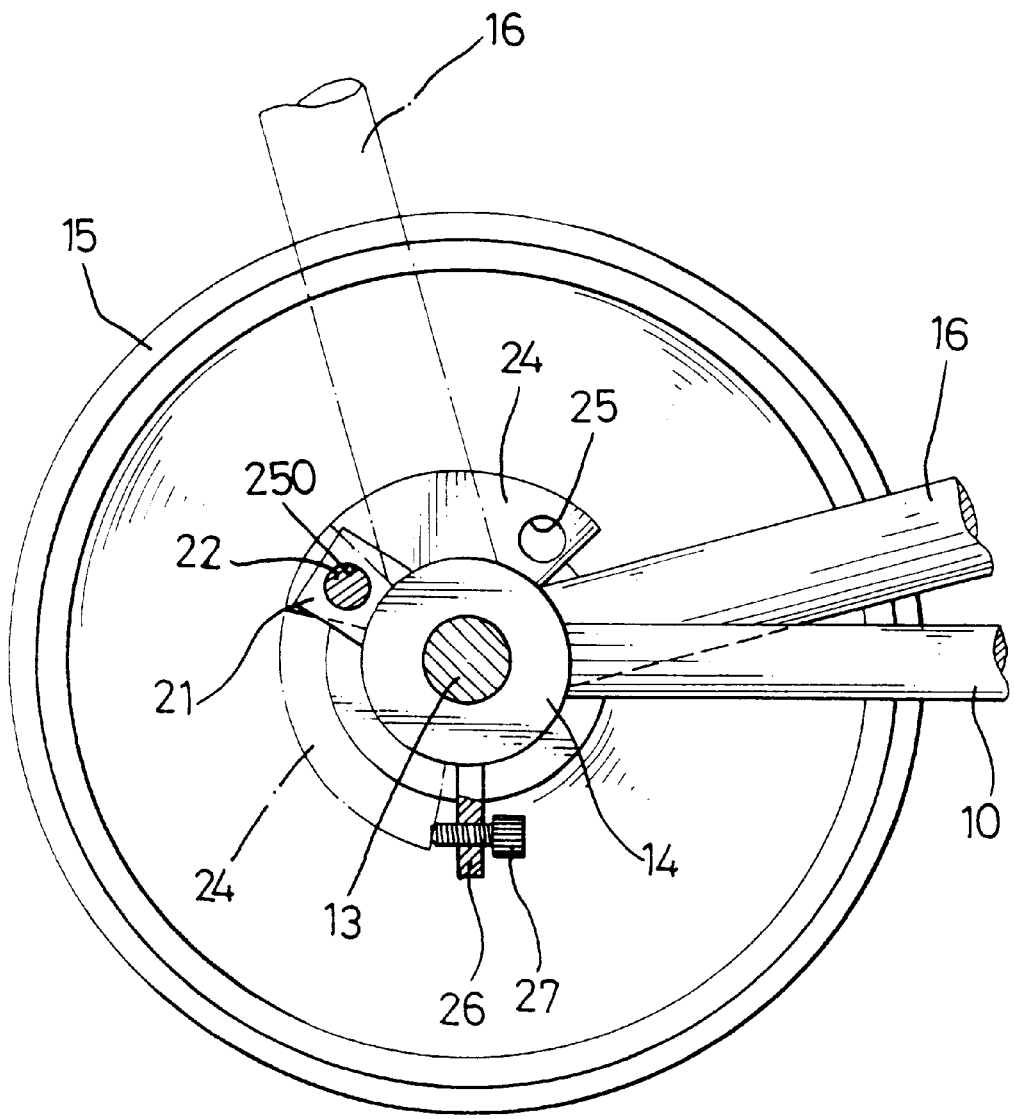
FIG. 4 is an illustrative view to illustrate the two positions of the connecting frame can be positioned corresponding to the chassis.
Figure 7:
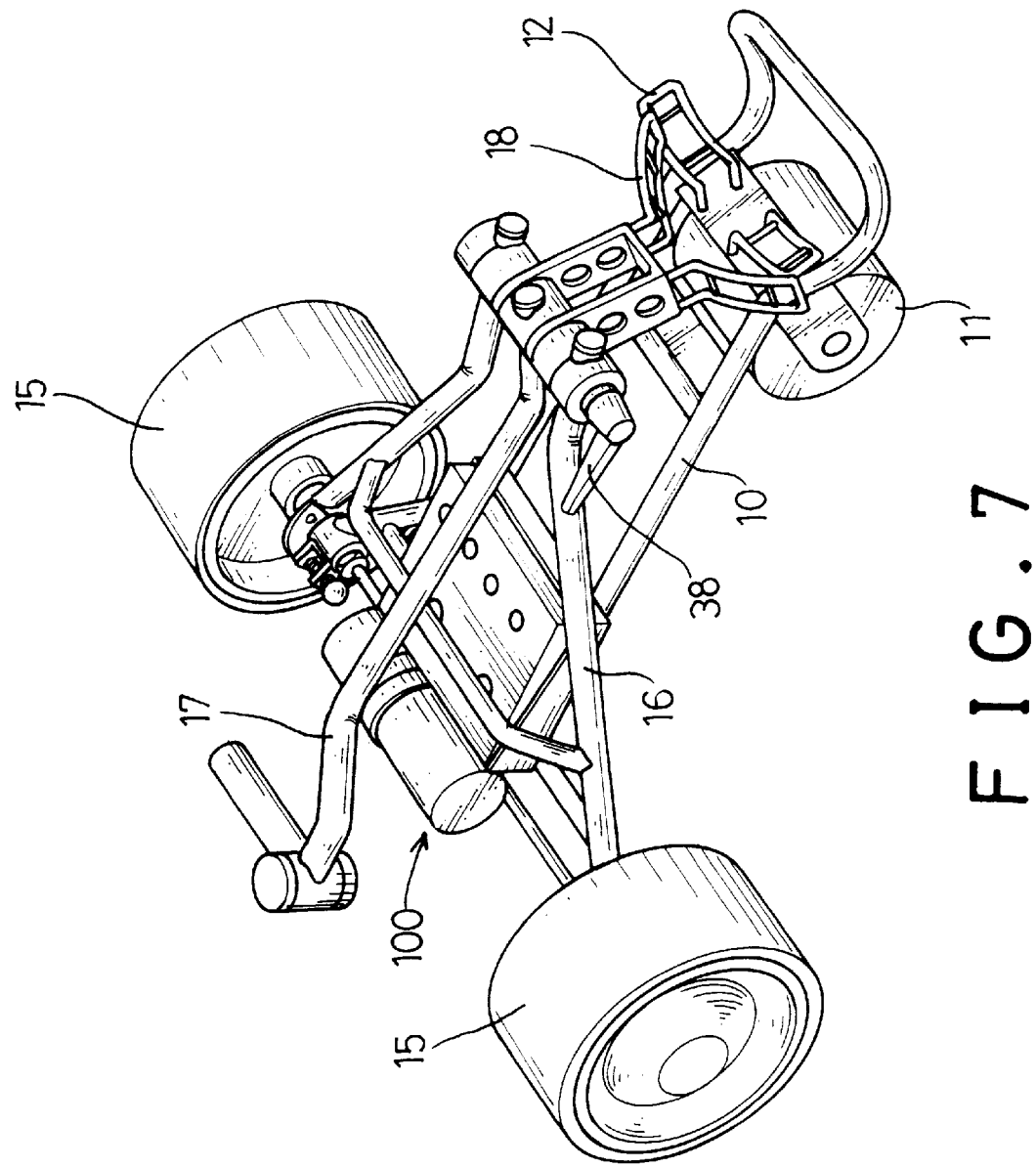
FIG. 7 is a perspective view to show the golf cart folded to a compact size.

Referring to FIGS. 1 through 4, a foldable golf cart comprises a chassis 10 which is substantially a triangular frame and has a front wheel 11 connected to the front end thereof and two rear wheels 15 connected to two sides of the rear end thereof. A driving mechanism 100 is connected to the axle 13 connected between the two rear wheels 15 with two bearings 14 mounted thereto so that the golf cart is moved by the driving mechanism 100. Two sleeves 160 are rotatably mounted to the axle 13 and each have a plate 24 extending radially outward therefrom. Each of the plates 24 has a first aperture 25 and a second aperture 250 defined therethrough. Two U-shaped brackets 21 are respectively connected to the two bearings 14 and each has two side plates through which a hole is defined for a pin 22 (FIG. 3) movably extending through the two holes in the two side plates of the U-shaped bracket 21. Each of the two pins 22 has a spring 23 mounted thereto which is biased between the two side plates of the U-shaped bracket 21 through which the pin 22 extends, and each of the pins 22 further has a spherical head 220 so that a user may pull the pin 22 by holding the spherical head 220. Each of the two pins 22 is insertable into either the first aperture 25 or the second aperture 250 in the plate 24 corresponding thereto. In other words, as shown in FIG. 4, the sleeves 160 may be rotated about the axle 13, when the pin 22 is inserted into the first aperture 25, the sleeve 160 together with the connecting frame 16 connected thereto are in an operational position, and when the pin 22 is moved from the first aperture 25, the sleeve 160 and the connecting frame 16 connected to the sleeve 160 are rotated toward the chassis 10 to the folded position till the pin 22 is inserted into the second aperture 250 as shown in FIG. 7. Each of the bearings 14 has a flange 26 extending radially outward therefrom and two bolts 27 respectively extend through the two flanges 26 so that the bolts 27 may respectively contact one of the two ends of the two plates 24 when the sleeves 160 are rotated to place the connecting frame members 16 in the folded position.

Figure 5:
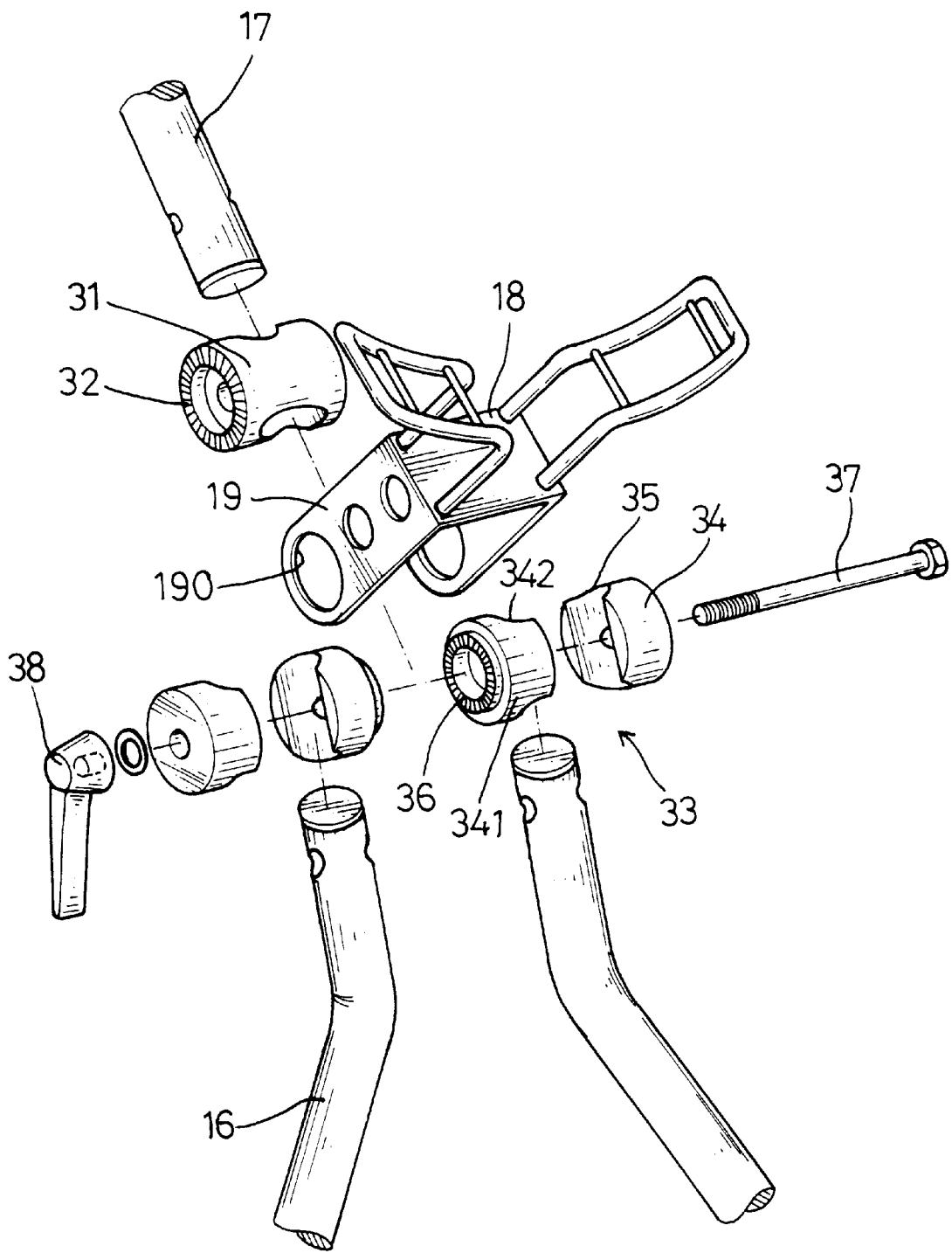
FIG. 5 is an exploded view of the foldable device connecting the handle and the connecting frame members of the golf cart in accordance with the present invention.
Figure 6:
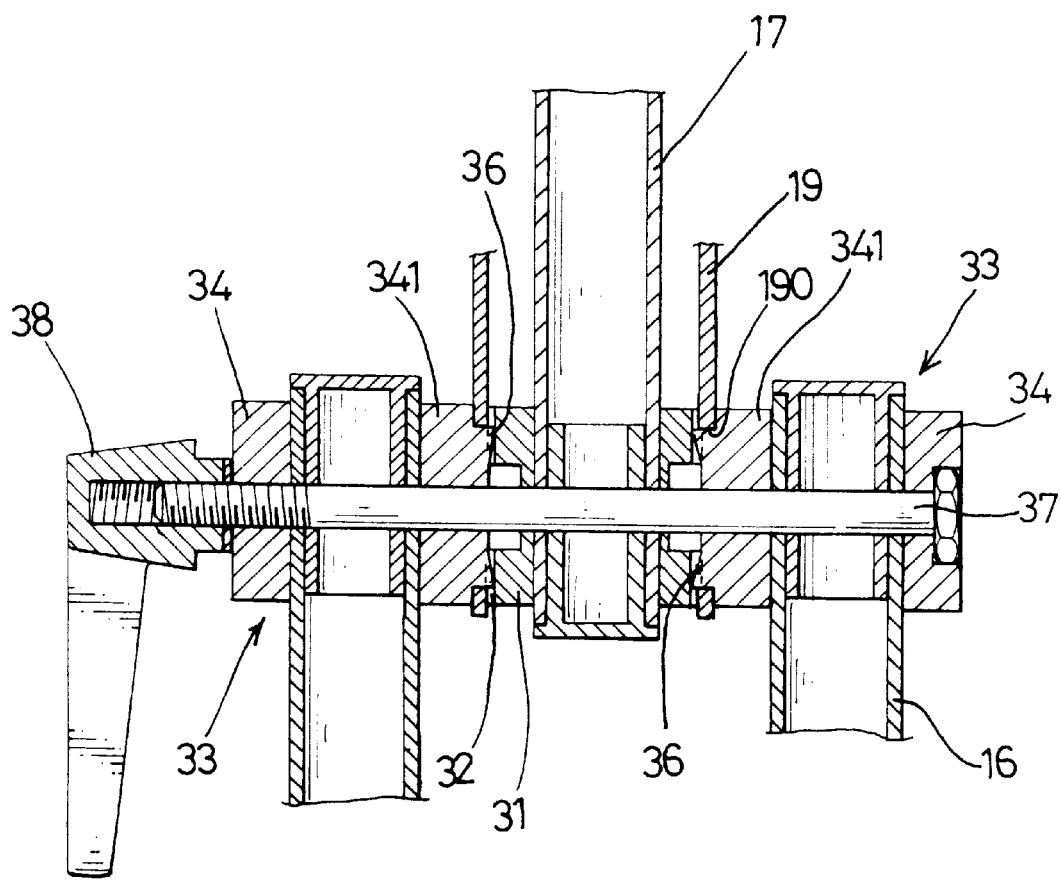
FIG. 6 is a side elevational view, partly in section, of the foldable device as shown in FIG. 5.

Referring to FIGS. 5 and 6, the two connecting frame members 16 are respectively connected to the two sleeves 160 and each have a clamp assembly 33 connected to the free end thereof. Each of the clamp assembly 33 comprises an exterior jaw 34 having a first concave face 35 defined therein and an interior jaw 341 having a second concave face 342 defined therein, the two free ends of the two connecting frame members 16 are respectively received in the area formed by the corresponding concave faces 35, 342. A cylindrical member 31 is rotatably connected between the two clamp assemblies 33, and a bolt 37 extends through the two clamp assemblies 33 and the cylindrical member 31. A lever 38 is threadedly engaged with the bolt 37. An upper bag support 18 is connected to the two clamp assemblies 33 and a handle 17 is fixedly connected to the cylindrical member 31. A lower bag support 12 is integrally formed extends from the front end of the chassis 10 so that a golf bag (not shown) can be supported on the two bag supports 12, 18.

The upper bag support 18 has two side plates 19, and each of the side plates 19 has a hole 190 defined therethrough. Each of the interior jaws 341 has a neck extending therefrom which has a first serrated end 26 defined therein, the two necks of the interior jaws 341 are inserted in the two holes 190. The cylindrical member 31 is received between the two side plates 19 and has a second serrated end 32 defined in each of the two ends thereof so as to be engaged with the first serrated end 26 on the corresponding interior jaw 341.

Accordingly, the handle 17 can be adjusted by first loosening the lever 38 so that the two interior jaws 341 are slightly separated laterally by the expanding force of the two side plates 19 of the upper bag support 18 so that the cylindrical member 31 can be rotated over the two first serrated ends 36, and the handle 17 is positioned when the bolt 37 is securely connected by tightening the lever 38 again. The handle 17 and the connecting frame members 16 are folded to let the golf cart have a compact size as shown in FIG. 7 to be conveniently stored.

Although the invention has been explained in relation to its preferred embodiment, it is to be understood that many other possible modifications and variations can be made without departing from the spirit and scope of the invention as hereinafter claimed.

What is claimed is:

1. A foldable golf cart comprising:

a chassis having a front wheel connected to the front end thereof and two rear wheels connected to two sides of the rear end thereof, an axle connected between said two rear wheels with two bearings mounted thereto, a lower bag support extending from the front end of said chassis, two sleeves rotatably mounted to said axle and each having a plate extending radially outward therefrom, each of said plates having at least two apertures defined therethrough, two U-shaped brackets respectively connected to said two bearings and each having a pin movably extending therethrough which is insertable into either one of at least two apertures in said plate corresponding thereto, each of said pins having a spring mounted thereto which is biased between the two side plates of said U-shaped bracket to which said pin extends;

two connecting frame members respectively connected to said two sleeves and each having a clamp assembly connected to the free end thereof, a cylindrical member rotatably connected between said two clamp assemblies and a bolt extending through said two clamp assemblies and said cylindrical member, a lever threadedly engaged with said bolt;

an upper bag support connected to said two clamp assemblies and a handle fixedly connected to said cylindrical member; and two flanges respectively extending from said two bearings and each having a bolt extending therethrough so that said bolt contacts one of two ends of said two plates.

2. The golf cart as claimed in claim 1, wherein each of said pins has a spherical head.

3. The golf cart as claimed in claim 1, wherein each of said clamp assemblies comprises an exterior jaw having a first concave face defined therein and an interior jaw having a second concave face defined therein, said two free ends of said two connecting frame members respectively received in the area formed by the corresponding concave faces.

4. The golf cart as claimed in claim 1, wherein each of said clamp assemblies has a neck extending therefrom which has a first serrated end defined therein, said upper bag support having two side plates and each of said side plates having a hole defined therethrough, said two necks of said clamp assemblies inserted in said two holes and said cylindrical member received between the two side plates, said cylindrical member having a second serrated end defined in each of said two ends thereof so as to be engaged with said first serrated end corresponding thereto.

* * * * *